United States Patent
Meschke et al.

(10) Patent No.: US 8,574,500 B2
(45) Date of Patent: Nov. 5, 2013

(54) COMPONENT MADE OF A STACK OF CERAMIC PLATES

(75) Inventors: Frank Meschke, Buchenberg (DE); Andreas Lemke, Dachau (DE); Stefanie Wildhack, Kempten (DE); Paul Salansky, Ermengerst (DE)

(73) Assignee: ESK Ceramics GmbH & Co. KG, Kempten (DE)

( * ) Notice: Subject to any disclaimer, the term of this patent is extended or adjusted under 35 U.S.C. 154(b) by 0 days.

(21) Appl. No.: 13/063,473

(22) PCT Filed: Aug. 12, 2009

(86) PCT No.: PCT/EP2009/005860
§ 371 (c)(1),
(2), (4) Date: Mar. 11, 2011

(87) PCT Pub. No.: WO2010/028727
PCT Pub. Date: Mar. 18, 2010

(65) Prior Publication Data
US 2011/0165033 A1 Jul. 7, 2011

(30) Foreign Application Priority Data
Sep. 12, 2008 (DE) .......................... 10 2008 048 014

(51) Int. Cl.
| G05D 7/00 | (2006.01) |
| G05B 1/00 | (2006.01) |
| B01J 19/00 | (2006.01) |
| B01J 8/00 | (2006.01) |
| B01J 8/02 | (2006.01) |
| B01J 35/02 | (2006.01) |
| F28F 7/00 | (2006.01) |

(52) U.S. Cl.
USPC ........... 422/110; 422/105; 422/108; 422/129; 422/130; 422/211; 422/224; 422/240; 422/600; 422/601; 422/602; 422/603; 165/185

(58) Field of Classification Search
USPC ......... 422/129, 130, 105, 108, 110, 600–603, 422/211, 224, 240; 165/185
See application file for complete search history.

(56) References Cited

U.S. PATENT DOCUMENTS

| 2,705,617 A | 4/1955 | Ekwall |
| 4,159,953 A * | 7/1979 | Paquette .................. 210/396 |

(Continued)

FOREIGN PATENT DOCUMENTS

| DE | 26 49 361 A1 | 6/1977 |
| DE | 10 2004 005 832 A1 | 9/2004 |
| DE | 10 2006 009 791 A1 | 9/2007 |
| DE | 10 2006 028 852 A1 | 12/2007 |
| DE | 10 2006 013 503 A1 | 1/2008 |
| WO | 2007/050013 A1 | 5/2007 |
| WO | 2007/110196 A1 | 10/2007 |

*Primary Examiner* — Walter D Griffin
*Assistant Examiner* — Natasha Young
(74) *Attorney, Agent, or Firm* — Nath, Goldberg & Meyer; Jerald L. Meyer

(57) ABSTRACT

The invention relates to a component comprising a plurality of plates stacked on each other, at least one of said plates being made of a ceramic material and in which a channel area is formed of fluid flow guide channels by means of webs, said channels having a flow connection to inlet and outlet openings, wherein the stack of plates is connected by force fit by means of a clamping device, and wherein a flat seal is disposed between each of the individual plates of the stack, wherein the flat seal is made of an elastic and/or compressible material and covers both the channel area and the areas encompassing the inlet and outlet openings, and at least partially covers the top sides of the webs forming the channels. The components according to the invention are pressure-tight, resistant to thermal shock, and can be dismantled.

27 Claims, 3 Drawing Sheets

(56) References Cited

U.S. PATENT DOCUMENTS

| | | | |
|---|---|---|---|
| 4,442,886 A | 4/1984 | Dinulescu | |
| 5,826,981 A * | 10/1998 | Fowler et al. | 366/337 |
| 6,878,477 B2 * | 4/2005 | Frank et al. | 429/435 |
| 2002/0168308 A1 * | 11/2002 | Loffler et al. | 422/211 |
| 2004/0185576 A1 * | 9/2004 | Bopp et al. | 436/514 |
| 2005/0129580 A1 * | 6/2005 | Swinehart et al. | 422/100 |
| 2009/0151917 A1 * | 6/2009 | Meschke et al. | 165/168 |

* cited by examiner

COMPONENT MADE OF A STACK OF CERAMIC PLATES

This is a National Phase Application filed under 35 U.S.C. 371 as a national stage of PCT/EP2009/005860, with the filing date of Aug. 12, 2009 an application claiming the benefit from the German Application No. 10 2008 048 014.2, filed on Sep. 12, 2008, the entire content of each of which is hereby incorporated by reference in its entirety.

FIELD OF THE INVENTION

The invention relates to a component made of a multiplicity of plates stacked on one another, at least one of which consists of a ceramic material, the stack of plates being connected with a force fit by means of a clamping device and a specially formed flat seal respectively being arranged between the individual plates of the stack. The component may in particular be a plate heat exchanger or a reactor.

BACKGROUND OF THE INVENTION

Ceramic parts are generally used in plant and machine construction where wear, corrosion and high thermal stresses occur. The hardness, chemical stability and thermal conductivity of industrial ceramics, in particular silicon carbide ceramics, are far superior to those of steels and graphite as alternative materials.

Silicon carbide (SiC) as an example of an industrial ceramic has the particular advantage of a 4-times better thermal conductivity than steel and a hardness similar to that of diamond. Besides use in nozzles, valves, slip ring seals and sliding bearings, the overall property profile makes the material highly suitable for use in heat exchangers and microreactors as well.

In heat exchangers and microreactors, for fluid dynamic reasons, the parts must be internally shaped in a highly complex way. Often, the design is incompatible with the available ceramic shaping methods, so that it is necessary to connect individual ceramic components together. Force- and material-fit connections may be used.

PRIOR ART

Sintered silicon carbide (SSiC) is a new material in the field of the plate heat exchangers and microreactors.

A material-fit connection of SiC parts is possible in principle. Compared with a force-fit connection, it offers the great advantage that hazardous or toxic media flowing through are permanently sealed hermetically. Sintered silicon carbide can in particular be connected with a material fit by the methods of diffusion welding, laser beam welding and soldering with metal or glass solders. A common feature of said methods is that the parts are connected permanently and therefore inseparably.

DE 10 2004 044 942 A1 describes a method for connecting SiC parts by a diffusion welding method, the parts being connected with little deformation to form a monolith.

Diffusion-welded SiC parts and components produced therefrom, such as described in the aforementioned document, exhibit considerable advantages in relation to service life, and they can be used even at extremely high temperatures. Operating pressures of 16 bar or more are possible. Dismantling for maintenance work and inspection, however, is not possible or possible only destructively. Cleaning is possible only with increased outlay by means of chemical or pyrolytic processes, or not possible at all.

Diffusion-welded SiC heat exchangers are furthermore characterized by a high stiffness. During operation with media having large temperature differences, thermally induced stresses can build up and there is a risk of damage, particularly by exposure to a thermal shock.

In certain applications, it is required that the apparatus can be dismantled easily in order to carry out cleaning and removal of deposits on the heat exchanger or reactor surfaces with little outlay. The use of seals is unavoidably necessary for this.

In conventional plate heat exchangers, fluids flowing through are sealed from one another and externally with the aid of circumferential seals, which are placed between the flexible plates. In metal plate heat exchangers, elastomers such as NBR, EPDM, FPM and other types of rubber are predominantly used as the sealing material, and predominantly PTFE in the case of graphite plate heat exchangers.

It is known to introduce structures which increase stability and improve the distribution of the fluids into the plane of the heat exchanger plates. These structures are formed so that in the clamped state they touch the neighboring heat exchanger plate and therefore contribute to supporting it. Various versions of sealing concepts are to be found in the prior art. These include circumferential seals which bear flat on the outer region of the plates, the surface structures of the plates being slightly elevated. It is, however, more customary for the surface structures to be made flush and for the seals, for example O-rings, to be placed and fixed in indentations/grooves.

GB 2 128 726 A describes a plate heat exchanger made of metallic materials, for example stainless steel or titanium, in which the individual plates are connected to one another by means of circumferential seals placed in grooves. In the region of the inlet and outlet openings for the media, the plates are provided with a special structure in order to improve the sealing effect.

WO 00/77468 A1 likewise describes a (metal) heat exchanger with circumferential seals, which are placed in grooves. In order to fix the seals better, the seals and the grooves have at least one widening formed in the shape of a tongue. The seals are preferably made of rubber.

EP 1 757 887 A1 describes a heat exchanger block which consists of two plates with caps fitted on. A coolant flows through the spaces between the outwardly facing surfaces of the plates and the caps. Flow channels for a gaseous medium, which are formed by mutually complementary grooves in the plate surfaces, are provided in the plates.

The plates are made of graphite, a ceramic material or a composite material consisting of a polymer matrix with a large proportion of thermally conductive particles distributed therein, and the caps are made of a metallic material.

The heat exchanger unit, consisting of the two plates, is connected to the caps by circumferential flat or O-ring seals. The two plates are connected to one another by means of adhesive or a soft seal in order to seal the gap between the plates.

EP 0 203 213 A1 describes a plate heat exchanger made of a graphite-fluoropolymer composite material, in which corrosion-resistant flexible seals are placed between the frames of neighboring plate elements. The flat seals are made, for example, of fluoropolymers. Graphite sheets, which are compressed to from 0.1 to 0.3 mm, are preferably used. The flat seals are circumferential and lie in indentations, which are formed in the edge region of the plates.

DE 10 2006 013 503 A1 describes a plate heat exchanger whose plates have fluid flow guide channels, in the side walls of which holes are provided which lead to turbulence of the fluid flow. The plates are preferably made of ceramic material such as sintered silicon carbide (SSiC). In one embodiment, the plates may also be connected to one another by circumferential seals, for example made of elastomer material.

A feature common to the sealing concepts for plate heat exchangers having plates made of metal, plastic or graphite is that the plates are highly deformable. Irregularities in the plates or construction can be compensated for by deformation.

Heat exchanger parts made of ceramic materials, on the other hand, are extremely stiff. Irregularities, for example in the plates or construction, can be compensated for only to a very small extent by deformation. With an increasing plate size and height of the clamped plate stack, the risk that fracture of the plates will occur increases greatly.

In DE 10 2006 013 503 A1, the individual ceramic plates are hollow after assembly of the plate stack, that is to say intermediate spaces are formed between the webs and the neighboring plates. When the stack is clamped, bending moments can occur which may lead to fracture of the stiff ceramic material (see Reference Examples 2 and 3).

DE 196 17 396 A1 discloses a flow module constructed from plates, with profiled plates made of plastic, metal or graphite. The plates are connected to one another by circumferential seals. The seals are preferably elastomer seals which are integrated into circumferential grooves, in which case they may be either placed in or else vulcanized in or injected in.

DE 10 2006 009 791 A1 describes sealed plates made of ceramic material for heat exchangers. Here, the seals are configured as circumferential O-ring seals. The heat exchanger plates have rectangularly formed grooves in the regions comprising the flow region and the access openings, in each of which grooves a sealing system in the form of an O-ring is arranged. The cross section of the grooves is formed so that, when the plate stack is in the clamped state, they can fully accommodate the O-ring seal and the plane surfaces of the heat exchanger plates bear fully on one another without a gap both on the fluid flow-guiding webs and on the plate edge regions.

A disadvantage with these solutions (DE 196 17 396 A1 and DE 10 2006 009 791 A1) is that the plates must be manufactured with a very high dimensional accuracy, and the greatest possible planarity and plane parallelism needs to be ensured. In the event of plates which have a sizeable distortion or irregularities owing to production, it is no longer possible to make the plates bear fully and without a gap on the webs as well as on the plate edge regions. Cavities are again formed and there is a risk of plate fracture when clamping. The risk of fracture increases further with the plate size, and therefore so do the required processing outlay and the costs of the heat exchanger plate.

Another disadvantage is that these solutions can only be implemented by forming a rectangular circumferential groove with high manufacturing accuracy in the ceramic plates. The challenge in the sealing concept described here thus consists in producing the grooves in the ceramic material with a constant depth, in order to provide an ideal basis for the function of the seal. If the seal protrudes pointwise from the surface in the event of differing depths in the rectangular groove, stress peaks occur at the local elevations and lead to plate fracture when the plate stack is clamped (see Comparative Example 1). On the other hand, undesirable leakage occurs if the groove is made pointwise too deep, and the application force of the seal is locally reduced or entirely absent.

A rectangular groove necessary for this, with low manufacturing tolerances in the range of a few micrometers, is however very elaborate in terms of manufacturing technology for ceramic plates and can be produced only with high costs.

OBJECT OF THE INVENTION

It is therefore the object of the invention to provide a component, in particular a plate heat exchanger or a plate reactor, made of a multiplicity of plates stacked on one another, in which complexly shaped ceramic plates with wide manufacturing tolerances, above all in relation to planarity and distortion, can be connected or clamped together to form a pressure-tight, thermal shock-resistant and dismantlable unit, without fracture of the plates occurring.

SUMMARY OF THE INVENTION

The above object is achieved according to the invention by a component comprising a multiplicity of plates stacked on one another as claimed in claim 1. Advantageous or particularly expedient configurations of the subject of the application are specified in the dependent claims.

The invention therefore relates to a component comprising a multiplicity of plates stacked on one another, at least one of which consists of a ceramic material and in which by means of webs a channel region is formed of fluid flow guide channels, which are in flow communication with inlet and outlet openings, the stack of plates being connected with a force fit by means of a clamping device and a flat seal respectively being arranged between the individual plates of the stack, wherein the flat seal consists of a resilient and/or compressible material and covers both the regions encompassing the channel region and the inlet and outlet openings as well as, at least partially, the web upper sides of the webs forming the channels.

According to one preferred embodiment, the component according to the invention is a plate heat exchanger.

According to another preferred embodiment, the component according to the invention is a reactor, in particular a plate microreactor having at least two separate fluid circuits.

The flat seals provided according to the invention are configured so that, besides the circumferential sealing surface around the channel region flowed through and around the inlet and outlet openings of the individual plates, the web upper sides of the webs forming the channels are also at least partially covered. To this end, in the flat seal used according to the invention, it is preferable for there to be at least one connection between two opposite longitudinal or wide sides of the circumferential portion of the seal. It is, however, also possible for only elements of the plate structure including some or all of the web upper sides of the webs forming the channels to be covered with sealing material, without there being one or more connections between two opposite longitudinal or wide sides of the seal.

According to the invention, in particular by means of the special seal geometry, complexly shaped heat exchanger plates can be connected to form a dismantlable pressure-tight unit. Ceramic plates with wide manufacturing tolerances, above all in relation to planarity and distortion, can be sealed without fracture of the plates. In particular, even large-format ceramic plates can be sealed.

In contrast to the prior art, grooves do not have to be formed around the flow region and the inlet and outlet openings, so that the plates can be produced more simply in terms of manufacturing technology and more economically.

The sealed units are pressure-proof and can preferably be exposed to an internal pressure of 8.5 bar or more, more preferably to an internal pressure of 16 bar or more.

Owing to the connection between the two wide or longitudinal sides of the circumferential portion of the seal, which is preferred according to the invention, the special design of the flat seals according to the invention provides greater mechanical stability and improved endurance compared with the prior art, which offers a considerable facilitation of handling when changing a seal. Squeezing of the seal out of the sealing gap is made more difficult when the components are exposed to internal pressure.

Furthermore, the resilient and/or compressible seals provide good thermal shock resistance of the thermal engineering component as well as a long service life and high corrosion resistance in the application region of the sealing material in question.

DETAILED DESCRIPTION OF THE INVENTION

According to the invention, component parts in the form of plates, at least one of which consists of a ceramic material, in particular heat exchanger or microreactor parts, are connected by force fit in a clamping device by means of special flat seals placed between the plates. By means of the special seal geometry, complexly shaped thermal engineering parts can be connected to form a dismantlable pressure-tight unit. In particular, even large-format ceramic plates, including ones with wide manufacturing tolerances above all in relation to planarity and distortion, can also be sealed without fracture of the plates.

Preferably, besides the circumferential sealing surface around the channel region flowed through and around the region encompassing the inlet and outlet openings, the web upper sides of the webs forming the channels are also at least partially covered by the flat seal provided according to the invention. Preferably, the flat seal covers 50-100% of the web upper sides of the webs forming the channels (cf. FIGS. 2 and 3 as well). The coverage of the web upper sides by the flat seal may, however, also amount to less than 50%. Preferably, there is at least one connection between two opposite longitudinal or wide sides of the circumferential portion of the seal. The described configurations of the flat seal, when the plate stack is assembled, lead to mutual support of the plates and provide increased tolerance in relation to clamping of the plate stack. Bending moments in stiff ceramic plates as well as possible brittle fracture are therefore avoided.

It is also possible to use a continuous full-surface flat seal, in which only the inlet and outlet openings are uncovered. Preferably, however, additional openings are provided in the flat seal so that the flat seal bears on only some or all of the webs in the channel region, and not over the fluid-guiding channels of the heat exchanger plates. Preferably, there is at least one connection between the two opposite longitudinal or wide sides of the circumferential portion of the seal. These connections between the circumferential portion of the seal are simultaneously used for support of the ceramic plates as well as for fastening. They give the flat seal greater mechanical stability and improved endurance, which offers a considerable facilitation of handling when changing a seal. Squeezing of the seal out of the sealing gap when the components are exposed to internal pressure is moreover made more difficult. This allows the sealing of the components up to pressures of 16 bar or more.

Openings may also be provided in the circumferential region of the flat seal, which reduce the bearing surface and therefore increase the application pressures which can be achieved.

The flat seals provided according to the invention consist of a resilient and/or compressible material whose Young's modulus, hardness and/or structural configuration on the one hand allow deformation of the seal under stress, so that irregularities, waviness or distortion of stiff ceramic heat exchanger plates or reactor plates can be compensated for. The seal provided according to the invention—in contrast to metal or graphite plate heat exchangers in which the plates are resilient or deformable—is therefore not only used to seal the heat exchanger unit but also protects ceramic plates against high deformation and possible brittle fracture. On the other hand, after the deformation of the sealing material which occurs during assembly, an equilibrium state should be set up which prevents further creep of the sealing material and therefore ensures that the flat seal withstands even large internal pressures.

The flat seal preferably consists of elastomers such as synthetic, semisynthetic or natural rubber materials, thermoelastic polymers, thermoplastic polymers, in particular polytetrafluoroethylene, or of graphite. The compressibility may also derive from the structural configuration of the sealing material, as is possible for example when using foamed plastics. Sealing sheets made of 100% pure virgin extruded polytetrafluoroethylene (ePTFE) are particularly preferred. The fiber structure of this sealing material, generated by multidirectional stretching, allows a maximum deformation of 40% or more of its initial thickness, depending on the sheet configuration used, and it is therefore particularly suitable for compensating for significant irregularities or distortion of sizeable ceramic plates. After full compression, the structure is compacted and a sufficiently pressure-proof leaktight material is obtained.

As a variant, the sealing material may contain fillers, for example in order to increase the thermal conductivity.

The materials preferably have a cold heading value $\epsilon_{KSW}$ according to DIN 28090-2 of $\geq 20\%$, more preferably $\geq 30\%$, particularly preferably $\geq 40\%$.

The materials also preferably have a compressibility according to ASTM F36 of $\geq 20\%$, more preferably $\geq 35\%$, particularly preferably $\geq 45\%$.

Depending on the application of the thermal engineering components, the flat seal materials must satisfy the requirement profile of the thermal engineering application in question. These requirements may, in particular, be: long-term temperature stability up to at least 150° C., corrosion resistance against seawater, corrosion resistance in acidic media, corrosion resistance in alkaline media, resistance against hot water and increased thermal conductivity in comparison with standard sealing materials.

The flat seal materials have a lower Young's modulus than the ceramic materials. When they are applied between the parts, thermomechanical stresses can therefore be reduced during operation and higher thermal shock stresses can therefore be tolerated.

The thickness of the flat seal used is dictated by the extent of the irregularities of the thermal engineering parts, which have to be compensated for, and is given by the maximum deformability of the sealing material ($=[h_{D1}-h_{D3}]/h_{D1}$), where $h_{D1}$ is the initial thickness and $h_{D3}$ is the thickness after applying the main load. If for example there is a distortion of 200 μm in the diagonal direction of the plates, then a flat seal with a maximum deformation of 50% must have a minimum initial thickness of 0.4 mm for pressure-proof sealing of the unit. The maximum deformation of a material, however, should not be equated with the values often to be found in data sheets for compressibility ($=[h_{D2}-h_{D3}]/h_{D2}$; according to ASTM F36) and cold heading behavior ($=[h_{D2}-h_{D3}]/h_{D1}$; according to DIN 28090-2), in which $h_{D2}$ is the thickness after applying a preliminary load.

According to a preferred embodiment, the ceramic material of at least one of the plates consists of silicon carbide (SiC), fiber-reinforced silicon carbide, sintered silicon carbide (SSiC), silicon nitride ($Si_3N_4$), aluminum oxide ($Al_2O_3$), zirconium dioxide ($ZrO_2$), titanium diboride ($TiB_2$) or combinations thereof. Owing to its high thermal conductivity and universal corrosion resistance, at least one of the plates to be connected is preferably sintered silicon carbide (SSiC). For example, SSiC materials with a fine-grained structure are particularly suitable, preferably with an average grain size <5 μm, such as are marketed for example under the name EKasic® F by ESK Ceramics GmbH & Co. KG. Nevertheless, coarse-grained SSiC materials may also be used, for example with bimodal structure, in which case preferably 50 to vol % of the grain size distribution consists of prismatic SiC crystallites in platelet form with a length of from 100 to 1500 μm, and 10 to 50 vol % of prismatic SiC crystallites in platelet form with a length of from 5 to less than 100 μm (EKasic® C from ESK Ceramics GmbH & Co. KG). The measurement of the grain size or the length of the SiC crystallites may be determined with the aid of light microscopy structural recordings, for example with the aid of an image analysis program which determines the maximum Feret's diameter of the grain.

Depending on the function of the component, parts or plates made of glass, aluminum oxide ceramic or other ceramics may furthermore be used, for example $ZrO_2$ and $TiB_2$. In particular, it may be desirable for the base and/or cover plates of the plate stack to consist of glass, in order to provide the possibility of observation. A cover plate made of glass does not contain any webs forming a channel region.

It is also possible to use SiC materials which contain up to 35 vol % of further material components such as graphite, $B_4C$ or other ceramic particles. According to a preferred embodiment, the component has a purely ceramic structure, that is to say all the plates consist of a ceramic material, particularly preferably of SSiC.

In the individual plates of the components according to the invention, a channel system or channel region consisting of fluid flow guide channels is formed by means of webs. According to a preferred embodiment, the channel system may be formed according to DE 10 2006 013 503 A1 so as to obtain an essentially meandering profile of the fluid flow over the surface of the plates, the webs of the guide channels furthermore having a multiplicity of interruptions or holes which lead to turbulence of the fluid flow. Such turbulence allows efficient heat transfer and at the same time a small pressure loss. Another advantage of the design of such plates is that inlet and outlet openings for the fluid flows, for example in the form of bores, can already be integrated into the plates. According to a preferred embodiment, the guide channels in the plate are connected to a first inlet opening and a first outlet opening for a first fluid, and the plate is provided with a second inlet opening and a second outlet opening for a second fluid in order to supply a neighboring plate, in which case these openings may be provided in a straightforward way by bores.

The plates used according to the invention preferably have a thickness in the range of 0.2-20 mm, more preferably 3-12 mm and particularly preferably about 6-9 mm. The fluid or material flow in an exchange area of a plate is guided in a meandering shape according to a preferred channel system, in order to allow a residence time which is as long as possible. The webs of the guide channels in the exchange area have, as measured from the plate base, preferably a height in the range of 0.2-19 mm, more preferably 0.2-10 mm and particularly preferably 0.2-6 mm, and they end flush with the surface of the plates. The webs of the guide channels may be produced by milling, but may also be manufactured by pressing close to their final contour. If the webs of the guide channels have interruptions or holes according to the embodiment described in DE 10 2006 013 503 A1, these preferably have a width of 0.2-20 mm, more preferably 2-5 mm. The interrupted webs of the guide channels are also used as support points and, when there are pressure differences, they avoid undesired deformation of the plates and therefore likewise prevent plate fracture.

According to a preferred embodiment of the component according to the invention, all the plates of the stack are connected with a force fit using a flat seal respectively arranged between the plates, by clamping the plate stack between a base plate and a cover plate using a clamping device.

According to another embodiment two plates may be joined by a diffusion welding method with a material fit to form a seam-free monolithic plate block, and at least two such monolithic plate blocks are connected with a force fit by means of the flat seal. In this case, the flat seals in the unit connected in this way lie only between every other plate. This structure is referred to as "semi-welded", and permits applications in which the two channel systems have to withstand different stresses, for example different corrosive or abrasive stresses. For example, one channel system may be flushed with coolant (sealed side) while the second channel system is used to deliver extremely aggressive media (hot-connected side). In this embodiment, the extremely high abrasion and corrosion resistance of in particular SiC parts is combined with the advantages of sealed units, in particular the increased thermal shock resistance, the ability to be dismantled again and the possibility of cleaning the coolant side.

According to another embodiment, the component according to the invention is used as a reactor, for example for evaporation and condensation, but also for other phase conversions, for example for controlled crystallization processes. When used for evaporation and condensation, in order to achieve a reduced pressure loss it is preferable for the mutual spacing of the webs of the guide channels to become greater or smaller from the fluid inlet to the fluid outlet.

For particularly effective use as a reactor, it is expedient to incorporate reactor plates between the heat exchanger plates described above, in which case the heat exchanger plates are used to control the temperature of the reactor plates. The reactor plates may have various geometries. For a controlled residence time and defined precipitation reaction, for instance for controlled crystallization processes, it is for example advantageous to use reactor plates having continuous straight channels. It is, however, also possible for at least two initially separate fluid flows to be mixed together at a defined temperature in the reactor plate. To this end, channel structures are used with which the material flows are brought together in a defined region of the reactor plate and intensively mixed. The reactor plates may also have suitable catalytic coatings, which expediently accelerate a chemical reaction.

The components according to the invention can furthermore be produced by a simple and economical method. To this end, it is merely necessary to connect the plate stack with the flat seals arranged between them, and a base plate and a cover plate, by means of a clamping device. For example, the clamping is carried out in a metal frame between two steel plates, the application pressure due to the tightening of screws being transmitted onto the component via springs.

During processing of the plates provided with a channel system, the surfaces which later come into contact with the flat seals may be sand-blasted, lapped, ground or polished. It is, however, preferable to use unprocessed as-sintered surfaces for the connection by means of flat seals. Depending on the degree of surface processing, the ceramic plates have more or less irregularities, waviness or distortion, often amounting to several hundred μm.

In contrast to the prior art, grooves to receive the seals do not need to be incorporated around the channel region and around the inlet and outlet openings of the plates, so that the ceramic plates can be produced more simply in terms of manufacturing technology and more economically.

For applications with highly corrosive media at high temperatures, however, it may be advantageous to introduce grooves, for example rectangular grooves, around the channel region and the inlet and outlet openings. These grooves, however, are merely used as an additional safety buffer. It has been found that the compressible flat seal forms a bulge in the region of such grooves when clamping during assembly, which opposes a corrosive liquid as a further barrier. This bulge, however, does not extend as far as the bottom of the groove and is therefore not load-bearing.

The cutting of the flat seals may be carried out manually or by series production methods, for example water jet cutting, lasering or stamping.

For assembly, the plates and the flat seals are cleaned with compressed air or liquid cleaning agents and put together. The clamping is more suitably carried out in a metal frame between two steel plates, the application pressure due to the tightening of screws being transmitted onto the system via springs.

During assembly, the flat seals formed according to the invention may if necessary be locally fixed on the plates using an adhesive. As an alternative, the flat seals may be fixed during assembly by protruding and/or angled-off tongues. As a further alternative, an indentation may be formed locally in the surface of the plates, the flat seal being suspended therein to fix it for assembly. Fixing by means of one of the aforementioned methods or another method is not, however, categorically necessary for assembly.

BRIEF DESCRIPTION OF THE APPENDED DRAWINGS

Figure 1:
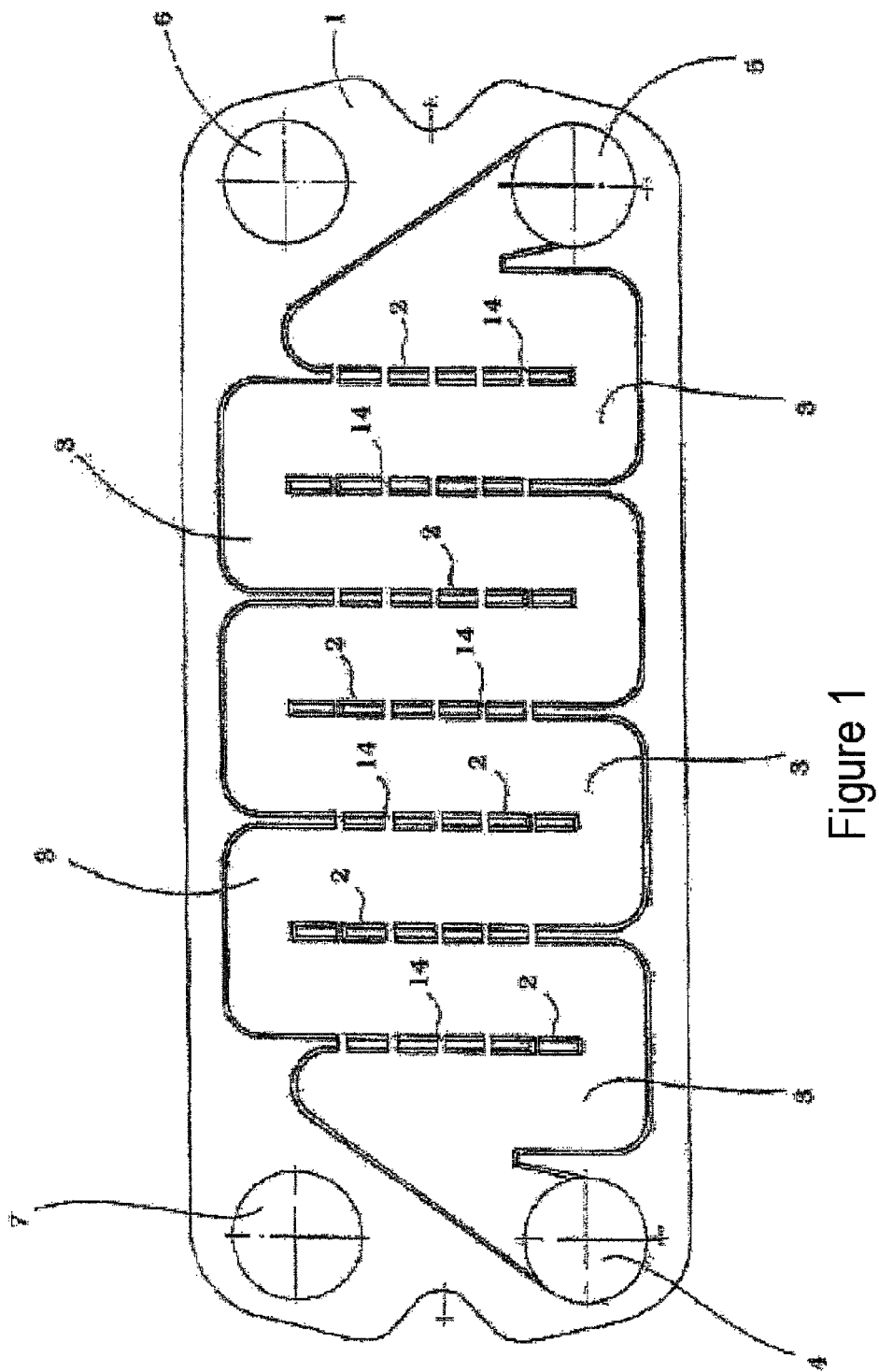
FIG. 1 shows the plan view of a heat exchanger plate made of sintered ceramic material, which is preferably used according to the invention.

As shown in FIG. 1, a plate 1 which can be used according to the invention has a channel system which is formed by guide channels 3 and permits an essentially meandering profile of the fluid flow over the surface of the plate. The side walls of the guide channels 3 in this figure consist of webs 2 with a width of 3 mm, which have a multiplicity of holes 14 with a width of 3.5 mm. The plate furthermore has a first inlet opening 4 and a first outlet opening 5 for a fluid flow, respectively in the form of a bore with a radius of 30 mm. A second inlet opening 6 and a second outlet opening 7 are furthermore provided in the plate, which are used as a feed-through to supply a neighboring chamber with another medium. The second inlet opening and the second outlet opening respectively consist of bores with a radius of 32 mm. The total length of the plate in this embodiment is 500 mm and its width 200 mm. As can be seen, the channel system in this embodiment has mirror symmetry. This mirror symmetry makes it possible for the plates to be stacked on one another while being alternately rotated with respect to one another respectively by 180°, so that the inlet openings lie alternately on the left and on the right.

Figure 2:
FIGS. 2 and 3 show plan views of preferred embodiments of the flat seals used according to the invention.
Figure 3:
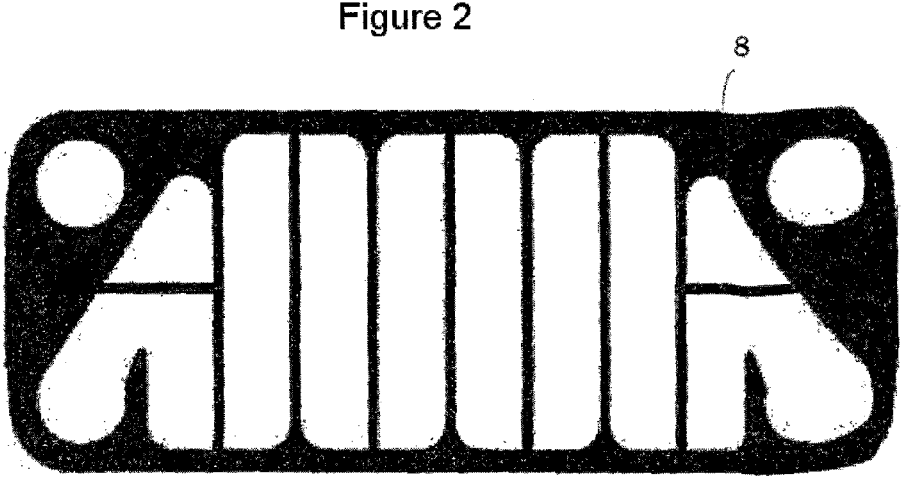

FIGS. 2 and 3 show plan views of two embodiments of flat seals 8 used according to the invention. In the flat seal 8 of FIG. 2, not only the regions of the plate 1 which comprise the channel region and the inlet and outlet openings are covered, but also about 50% of the web upper sides of the channel-forming webs 2 of the plate 1. In FIG. 3, the flat seal 8 covers about 100% of the web upper sides of the channel-forming webs 2 of the plate 1.

Figure 4:
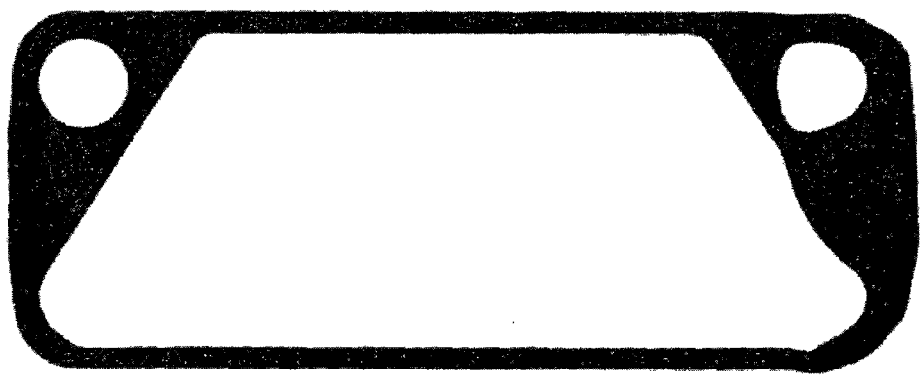
FIG. 4 shows an embodiment of a circumferential seal from Reference Example 3.

In the flat seal of a reference example, shown in FIG. 4, only the regions of the plate 1 which comprise the channel region and the inlet and outlet openings are covered, while the web upper sides of the webs 2 forming the channels are not.

Figure 5:
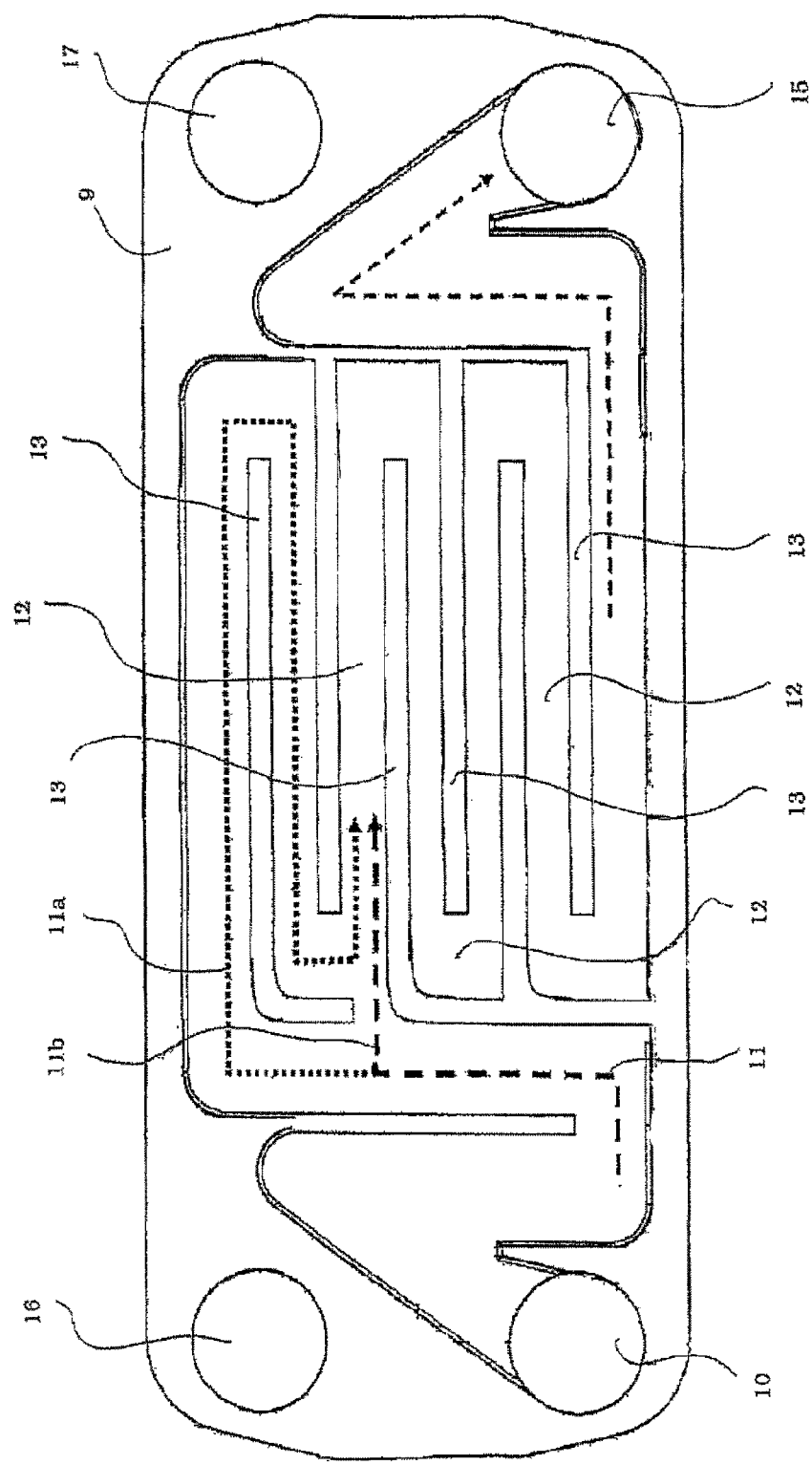
FIG. 5 shows the plan view of a reactor plate preferably used according to the invention.

FIG. 5 shows a reactor plate 9 which can be used according to the invention, having an inlet opening 10 for a fluid flow 11 that contains the reaction partners already in mixed form. The mixed fluid flow 11 is initially split by means of suitable channel guiding into two separate fluid flows 11a and 11b, which are subsequently combined again at an offset position (split-recombine mixer unit). Owing to this offset position, it is possible to achieve better mixing and therefore better conversion of the reaction partners. The fluid flow is then fed through a channel system 12, which is bounded by webs 13, and then leaves the reactor plate 9 through the outlet opening 15. The two bores 16 and 17 are intended to supply neighboring heat exchanger plates. The reactor plate shown in FIG. 5 may be combined with the flat seals formed according to the invention, such as the ones shown in FIGS. 2 and 3. In this case, the guide channels 12 of the reactor plate 9 are only partially covered with sealing material, since the connections between the longitudinal sides of the flat seal 8 extend transversely to the direction of the guide channels 12.

EXAMPLES, REFERENCE EXAMPLES AND COMPARATIVE EXAMPLES

The following examples, reference examples and comparative examples serve to explain the invention further.

Example 1

Heat Exchanger Comprising PTFE, Design FIG. 2, Web Surface 50%, Thickness 0.5 mm (1) SSiC plates with a bimodal structure are used, 50 to 90 vol % of the grain size distribution consisting of prismatic SiC crystallites in platelet form with a length of from 100 to 1500 μm, and 10 to 50 vol % of prismatic SiC crystallites in platelet form with a length of from 5 to less than 100 μm (EKasic® C from ESK Ceramics GmbH & Co.). The SSiC plates have a length of 500 mm, a width of 200 mm and a thickness of 6.5 mm.

(2) In order to produce a heat exchanger unit, four (intermediate) plates as well as a base plate and a cover plate are used. Incorporated into the intermediate plates, there are 3.5 mm deep guide channels according to the type of FIG. 1, which form the subsequent channel system. The base plate and the cover plate do not contain a channel structure, and the cover is provided with inlet openings. The plates are arranged in the unit so that two material flows can exchange heat in countercurrent flow.

(3) A sheet of ePTFE with the designation WT-A is used as the sealing material. The multidirectional fiber structure allows deformation of the PTFE seal under stress, so that irregularities, waviness or distortion of the SSiC plates used can be compensated for. According to the data sheet, the material has a cold heading value according to DIN 28090-2 of 40%.

In order to determine the required initial sheet thickness, however, the maximum deformability is required, which was determined with the aid of a pressure test apparatus. The sheet used in the example allows a maximum deformation of up to about 50% of its initial thickness.

(4) The surfaces of the SSiC plates, which are ground during the hard processing, exhibit a distortion in the diagonal direction of about 200 μm. As the sealing material, an ePTFE sheet is therefore used which can fully compensate for this irregularity. At 0.5 mm, the initial thickness is selected so that a residual thickness of 0.25 mm is achieved with full compression. It is, however, also possible to work with seals which exceed this thickness.

(5) The design of the resilient PTFE seal corresponds to FIG. 2. It is characterized in that besides the circumferential sealing surface in the outer region of the SSiC plates used, 50% of the upper sides of the ceramic webs are also covered with sealing material. It is produced by manual cutting.

(6) The plates and sheets are cleaned with compressed air and put together during assembly. The clamping is carried out in a metal frame between two steel plates; the application pressure due to the tightening of screws is transmitted onto the system via springs.

(7) For the pressure test, water is applied to the channels of the unit mounted in the metal frame through the inlets. Depending on the application pressure set up, internal pressures of up to 23 bar can be applied without the connected heat exchanger unit leaking.

With an application pressure of 6 N/mm², for example, a maximum internal pressure of 13 bar is obtained.

Example 2

Heat Exchanger Comprising PTFE, Design FIG. 3, Web Surface 100%, Thickness 0.7 mm (1) SSiC plates made of EKasic® C (structure and distortion as described in Example 1) with a length of 500 mm, a width of 200 mm and a thickness of 6.5 mm are used.

(2) The heat exchanger unit consists of four (intermediate) plates as well as a base plate and a cover plate, which are connected in countercurrent flow.

(3-5) A 0.7 mm thick ePTFE sheet with the designation WT-A (maximum deformation up to about 50% of its initial thickness) is used as the seal. The design of the seal corresponds to FIG. 3. It is characterized in that besides the circumferential sealing surface in the outer region of the SSiC plates used, 100% of the upper sides of the ceramic webs are also covered with sealing material. The cutting is carried out by water-jet cutting.

(6) The plates and sheets are cleaned with compressed air and are clamped in the metal frame between two steel plates.

(7) For the pressure test, water is applied to the channels of the unit mounted in the metal frame through the inlets. The connected heat exchanger unit exhibits no leakage with an application pressure of 9.5 N/mm² and an internal pressure of 23 bar.

Example 3

Heat Exchanger Comprising PTFE, Design FIG. 2, Web Surface 50%, Thickness 0.5 mm, Plates with Grooves (1) SSiC plates made of EKasic® C (structure and distortion as described in Example 1) with a length of 500 mm, a width of 200 mm and a thickness of 6.5 mm are used.

(2) In order to produce a heat exchanger unit, four (intermediate) plates as well as a base plate and a cover plate are used. Incorporated into the intermediate plates, there are 3.5 mm deep guide channels which form the subsequent channel system, as well as a rectangular circumferential groove with a depth of 2 mm±0.1 mm. The base plate and the cover plate do not contain a channel structure, and the cover is provided with inlet openings. The plates are arranged in the unit so that two material flows can exchange heat in countercurrent flow.

(3-5) The 0.5 mm thick ePTFE sheet with the designation WT-A, as described in Example 1, is used as the sealing material. The design of the flat seal corresponds to FIG. 2, with 50% covered upper sides of the ceramic webs.

(6) The plates and sheets are cleaned with compressed air and are clamped in the metal frame between two steel plates.

(7) For the pressure test, water is applied to the channels of the unit mounted in the metal frame through the inlets. The connected heat exchanger unit exhibits a comparable dependency to Example 1 of the application pressure set up and the achievable internal pressure. With an application pressure of 6 N/mm², there is correspondingly an internal pressure of 13 bar.

(8) After dismantling the heat exchanger unit, a slight bulge can be observed on the PTFE seal, which was formed during deformation of the resilient sealing material in the region of the grooves. It has the thickness of the initial sheet and does not therefore reach as far as the bottom of the groove, and is therefore not load-bearing. Furthermore, as described in (7), it has no influence on the sealing effect. During operation of the heat exchanger unit with corrosive media at high temperatures, however, it would be conceivable to use it as a safety buffer.

Example 4

Heat Exchanger Comprising Graphite Sheet, Full-Surface, Thickness 1 mm (1) SSiC parts with a fine-grained structure are used, the average grain size being <5 μm (EKasic® F from ESK Ceramics GmbH & Co.). The SSiC plates have a length of 500 mm, a width of 200 mm and a thickness of 6.5 mm.

(2) The heat exchanger unit consists of four (intermediate) plates as well as a base plate and a cover plate, which are connected in countercurrent flow.

(3-5) A 1 mm thick full-surface resilient graphite sheet is used as the seal. The cutting of the inlet openings is carried out manually. The ground surfaces of the SSiC plates exhibit a slight distortion in the diagonal direction of about 100 μm.

(6) The plates and sheets are cleaned with compressed air and are clamped in the metal frame between two steel plates.

(7) For the pressure test, water is applied to the channels of the unit mounted in the metal frame through the inlets. The connected heat exchanger unit exhibits no leakage with an application pressure of 6.5 N/mm² and an internal pressure of 9 bar.

Example 5

Heat Exchanger Comprising PTFE, Design FIG. 2, Web Surface 50%, Thickness 0.7 mm, Cyclic Pressure Resistance Test (1) SSiC plates made of EKasic® C (structure and distortion as described in Example 1) with a length of 500 mm, a width of 200 mm and a thickness of 6.5 mm are used.

(2) The heat exchanger unit consists of four (intermediate) plates as well as a base plate and a cover plate, which are connected in countercurrent flow.

(3-5) A 0.7 mm thick ePTFE sheet with the designation WT-A (maximum deformation up to about 50% of its initial thickness) is used as the seal, the design of which corresponds to FIG. 2 with 50% covered upper sides of the ceramic webs.

(6) The plates and sheets are cleaned with compressed air and are clamped in the metal frame between two steel plates with an application pressure of 6 N/mm$^2$.

(7) The sealed unit is placed with the metal frame in the test apparatus. One side of the channels is flushed through the inlets with cold cooling water at 16° C. (flow rate 1000 l/h), and the second side with steam (150° C., 4 bar, approximately 130 kg/h). After a holding time of 6 h, a plurality of cycles are carried out, cooling water and steam abruptly being switched off and on alternately. The sealed unit withstands both the holding time and the temperature cycles, without perceptible damage to the heat exchanger.

Reference Example 1

Heat Exchanger Comprising PTFE, Full-Surface, Thickness 0.25 mm (1) The structure of the SSiC plates (configuration, dimensions, design, irregularity), the construction of the heat exchanger unit and the assembly were adopted from Example 1.

(2) A full-surface ePTFE sheet with the designation WT-A (maximum deformation up to about 50% of its initial thickness) is used as the sealing material. The cutting of the inlet openings is carried out manually. At 0.25 mm, that is to say a thickness of 0.125 mm with full compression, the initial thickness is selected to be less than the irregularity of the plates (about 200 μm).

(3) For the pressure test, water is applied to the channels of the unit mounted in the metal frame through the inlets. Despite the application pressure of 6.5 N/mm$^2$, set comparably to Example 1, the system already exhibits increased leakage beyond 1 bar. Owing to the full-surface support of the SSiC plates, however, no plate fracture is observed.

Reference Example 2

Heat Exchanger Comprising PTFE Strip, Circumferential Seal (1) The structure of the SSiC plates (configuration, dimensions, design, irregularity) and the construction of the heat exchanger unit were adopted from Example 1.

(2) A compressible round PTFE strip is used as the seal. The strip is placed as a circumferential seal around the flow region and around the inlet openings of the SSiC plates, and compressed to a thickness of 0.1 mm (less than the irregularity of the plates). Assembly in the metal frame is subsequently carried out.

(3) For the pressure test, water is applied to the channels of the unit mounted in the metal frame through the inlets. In the pressureless state, the system is not leaktight, irrespective of the application pressure set up. Furthermore, occasional plate fracture is observed during assembly.

The bending moments introduced by the clamping evidently cannot always be absorbed, and fracture of individual SSiC plates occurs.

Reference Example 3

Heat Exchanger Comprising PTFE, Thickness 0.7 mm, as (1) The structure of the SSiC plates (configuration, dimensions, design, irregularity) and the construction of the heat exchanger unit were adopted from Example 1.

(2) A 0.7 mm thick ePTFE sheet with the designation WT-A (maximum deformation up to about 50% of its initial thickness) is used as the seal. The design of the seal corresponds to that of a circumferential seal, which is to say only the outer region of the SSiC plates and the region around the inlet openings are covered with sealing material (FIG. 4). The cutting is carried out manually.

(3) The plates and sheets are cleaned with compressed air and put together during assembly. The clamping is carried out in a metal frame between two steel plates: the application pressure due to the tightening of screws is transmitted onto the system via springs. Plate fracture already occurs before reaching the application pressure of 6 N/mm$^2$. A pressure test is not possible.

The bending moments introduced simultaneously lead to fracture of a plurality of the unsupported SSiC plates in the inner region.

Comparative Example 1

Heat Exchanger with Elastomer Seal in Groove (1) SSiC plates made of EKasic® C (structure as described in Example 1) with a length of 500 mm, a width of 200 mm and a thickness of 6.5 mm are used. The ground surfaces of the SSiC plates exhibit a distortion in the diagonal direction of about 100 μm.

(2) In order to produce a heat exchanger unit, four (intermediate) plates as well as a base plate and a cover plate are used. Incorporated into the intermediate plates, there are 3.5 mm deep guide channels, which form the subsequent channel system, as well as a rectangular circumferential groove with a depth of 2 mm±0.1 mm. The base plate and the cover plate do not contain a channel structure, and the cover is provided with inlet openings. The plates are arranged in the unit so that two material flows can exchange heat in countercurrent flow.

(3) In order to seal the SSiC plates, an elastomer (silicone profile Dow D94-30P) is vulcanized into the circumferential grooves according to DE 196 17 396 A1.

(4) The plates are cleaned with compressed air and put together in the metal frame between two steel plates for assembly. Clamping is not however possible; plate fracture occurs as soon as the screws are tightened. A pressure test is not possible.

(5) The reason for the plate fracture resides in the fact that the depth of the rectangular grooves cannot be made homogeneous over the 500 mm long SSiC plate, and therefore the elastomer seal does not retract fully into the groove at all points during clamping. Local elevations are therefore formed which act as stress peaks and lead to the plate fracture.

The invention claimed is:
1. A component comprising a multiplicity of plates (1) stacked on one another, at least one of which consists of a ceramic material and in which by means of webs (2) a channel region is formed of fluid flow guide channels (3), which are in flow communication with inlet and outlet openings (4, 5, 6, 7), the stack of plates being connected with a force fit by means of a clamping device and a flat seal (8) respectively being arranged between the individual plates (1) of the stack, wherein the flat seal (8) covers both the regions encompassing the channel region and the inlet and outlet openings (4, 5, 6, 7) as well as, at least partially, the web upper sides of the webs (2) forming the channels, wherein the flat seal (8) comprises a resilient and/or compressible material selected from the group consisting of: elastomers, thermoelastic polymers, thermoplastic polymers, and graphite, and wherein the thickness of the flat seal (8) is at least the ratio between the extent of the irregularities of the plates and the maximum deformability of the flat seal (8).

2. The component as claimed in claim 1, wherein the flat seal (8) covers 50-100% of the web upper sides of the webs (2) forming the channels.

3. The component as claimed in claim 1, wherein the flat seal (8) consists of a material having a cold heading value $\epsilon KSW$ according to DIN 28090-2 of 20%.

4. The component as claimed in claim 1, wherein the flat seal (8) consists of a material having a compressibility according to ASTM F36 of ≥20%.

5. The component as claimed in claim 1, wherein the ceramic material of at least one of the plates (1) comprises at least one of the group consisting of silicon carbide (SiC), fiber-reinforced silicon carbide, sintered silicon carbide (SSiC), silicon nitride ($Si_3N_4$), aluminum oxide ($Al_2O_3$), zirconium dioxide ($ZrO_2$), titanium diboride ($TiB_2$) and combinations thereof.

6. The component as claimed in claim 1, wherein the guide channels (3) in the plate (1) are in flow communication with a first inlet opening (4) and a first outlet opening (5) for a first fluid, and the plate (1) is provided with a second inlet opening (6) and a second outlet opening (7) for a second fluid in order to supply a neighboring plate (1).

7. The component as claimed in claim 1, wherein the plates (1) have a thickness in the range of 0.2-20 mm.

8. The component as claimed in claim 1, wherein the webs (2) of the guide channels (3) have a height in the range of 0.2-19 mm, and end flush with the surface of the plates (1).

9. The component as claimed in claim 1, wherein the guide channels (3) are formed so as to obtain an essentially meandering profile of the fluid flow over the surface of the plates (1), the webs (2) furthermore having a multiplicity of interruptions or holes (14) which lead to turbulence of the fluid flow.

10. The component as claimed in claim 1, wherein two ceramic plates (1) are joined by a diffusion welding method with a material fit to form a seam-free monolithic plate block, and at least two such monolithic plate blocks are connected with a force fit by means of the flat seal (8).

11. The component as claimed in claim 1, which is a plate heat exchanger.

12. The component as claimed in claim 1, which is a reactor having at least two separate fluid circuits.

13. The reactor as claimed in claim 12, wherein one or more reactor plates (9) are additionally provided between the plates (1), the reactor plates (9) having a different channel system from the plates (1).

14. The reactor as claimed in claim 13, wherein the channel system formed in the reactor plates (9) permits mixing of at least two initially separate fluid flows.

15. The reactor as claimed in claim 13, wherein the reactor plates (9) are catalytically coated.

16. The component as claimed in claim 1, wherein the plates have a thickness in the range of 3-12 mm.

17. The component as claimed in claim 1, wherein the plates have a thickness in the range of 6-9 mm.

18. The component as claimed in claim 1, wherein the webs of the guide channels have a height in the range of 0.2-10 mm, and end flush with the surface of the plates.

19. The component as claimed in claim 1, wherein the webs of the guide channels have a height in the range of 0.2-6 mm, and end flush with the surface of the plates.

20. The component as claimed in claim 1, wherein the flat seal comprises extruded polytetrafluoroethylene (ePTFE).

21. The component as claimed in claim 1, wherein the flat seal (8) consists of a material having a cold heading value $\epsilon KSW$ according to DIN 28090-2 of ≥30%.

22. The component as claimed in claim 1, wherein the flat seal (8) consists of a material having a cold heading value $\epsilon KSW$ according to DIN 28090-2≥40%.

23. The component as claimed in claim 1, wherein the flat seal (8) consists of a material having a compressibility according to ASTM F36 of ≥35%.

24. The component as claimed in claim 1, wherein the flat seal (8) consists of a material having a compressibility according to ASTM F36 of ≥45%.

25. The component as claimed in claim 1, wherein the ceramic material comprises sintered silicon carbide (SSiC).

26. The component as claimed in claim 1, wherein there is at least one connection between two opposite longitudinal or wide sides of the circumferential portion of the seal.

27. A component comprising a multiplicity of plates (1) stacked on one another, at least one of which consists of a ceramic material and in which by means of webs (2) a channel region is formed of fluid flow guide channels (3), which are in flow communication with inlet and outlet openings (4, 5, 6, 7), the stack of plates being connected with a force fit by means of a clamping device and a flat seal (8) respectively being arranged between the individual plates (1) of the stack, wherein the flat seal (8) covers both the regions encompassing the channel region and the inlet and outlet openings (4, 5, 6, 7) as well as, at least partially, the web upper sides of the webs (2) forming the channels, wherein the flat seal (8) comprises a material having a lower Young's modulus than the ceramic material and wherein the material of the flat seal (8) is selected from the group consisting of: elastomers, thermoelastic polymers, thermoplastic polymers, and graphite, wherein the thickness of the flat seal (8) is the ratio between the amount of the directional distortion of the plates (1) and the maximum deformability of the flat seal (8), and wherein the maximum deformability of the flat seal (8) is the difference between an initial thickness ($hD1$) and a main load thickness ($hD3$) divided by the main load thickness ($hD3$), wherein the main load thickness ($hD3$) is the thickness of the flat seal (8) after applying a main load.

* * * * *

UNITED STATES PATENT AND TRADEMARK OFFICE
CERTIFICATE OF CORRECTION

PATENT NO. : 8,574,500 B2  
APPLICATION NO. : 13/063473  
DATED : November 5, 2013  
INVENTOR(S) : Meschke et al.

Page 1 of 1

It is certified that error appears in the above-identified patent and that said Letters Patent is hereby corrected as shown below:

In the Claims

Claim 3, Column 15, Line 21,

Replace "DIN 28090-2 of 20%" with "DIN 28090-2 of ≥ 20%"

Signed and Sealed this  
Fourth Day of March, 2014

Michelle K. Lee  
*Deputy Director of the United States Patent and Trademark Office*